US007292940B2

(12) United States Patent
Isogai et al.

(10) Patent No.: US 7,292,940 B2
(45) Date of Patent: Nov. 6, 2007

(54) VEHICLE CONTROL SYSTEM

(75) Inventors: Akira Isogai, Anjo (JP); Eiji Teramura, Okazaki (JP); Takao Nishimura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 704 days.

(21) Appl. No.: 10/784,201

(22) Filed: Feb. 24, 2004

(65) Prior Publication Data
US 2004/0167702 A1 Aug. 26, 2004

(30) Foreign Application Priority Data
Feb. 24, 2003 (JP) ............................. 2003-046390

(51) Int. Cl.
*B60T 7/12* (2006.01)
(52) U.S. Cl. .................. 701/301; 701/96; 340/436; 340/903
(58) Field of Classification Search .................. 701/93, 701/96, 300, 301; 340/435, 436, 903; 180/170, 180/179
See application file for complete search history.

(56) References Cited

U.S. PATENT DOCUMENTS

| 6,362,729 | B1 | 3/2002 | Hellmann et al. | |
|---|---|---|---|---|
| 6,488,109 | B1 | 12/2002 | Igaki et al. | |
| 6,678,603 | B2 * | 1/2004 | Egawa et al. | 701/96 |
| 6,687,595 | B2 * | 2/2004 | Seto et al. | 701/96 |
| 6,769,504 | B2 * | 8/2004 | Kobayashi et al. | 180/169 |
| 6,819,283 | B2 * | 11/2004 | Okai et al. | 342/70 |
| 6,889,140 | B2 * | 5/2005 | Isogai et al. | 701/301 |
| 6,902,021 | B2 * | 6/2005 | Kikuchi et al. | 180/170 |
| 6,941,216 | B2 * | 9/2005 | Isogai et al. | 701/96 |
| 6,985,805 | B2 * | 1/2006 | Sudou et al. | 701/96 |
| 2001/0027372 | A1 * | 10/2001 | Hellmann et al. | 701/96 |
| 2003/0045990 | A1 * | 3/2003 | Adachi | 701/96 |
| 2004/0130481 | A1 * | 7/2004 | Okai et al. | 342/70 |
| 2005/0182551 | A1 * | 8/2005 | Sugano | 701/96 |
| 2006/0212207 | A1 * | 9/2006 | Sugano et al. | 701/93 |

FOREIGN PATENT DOCUMENTS

| JP | A-09-081900 | 3/1997 |
|---|---|---|
| JP | A-H10-338110 | 12/1998 |
| JP | A-H11-139278 | 5/1999 |
| JP | A-2001-030797 | 2/2001 |
| JP | A-2002-347546 | 12/2002 |

OTHER PUBLICATIONS

Notice of Rejection from Japanese Patent Office issued on Jan. 16, 2007 for the corresponding Japanese patent application No. 2003-046390 (a copy and English translation thereof).

* cited by examiner

*Primary Examiner*—Gary Chin
(74) *Attorney, Agent, or Firm*—Posz Law Group, PLC

(57) ABSTRACT

In a vehicle control system performing collision avoiding control when a collision with a preceding vehicle cannot be avoided by normal running condition control, driving safety is improved by prompting a driver to intervene in the vehicle's control in a reliable manner. When a set switch is turned on in the "cancel" state, the transition to the "in-control, inter-vehicle distance control" sub-state occurs and an inter-vehicle distance control is performed. If a collision with a preceding vehicle cannot be avoided by the inter-vehicle distance control (if the collision alarm flag XA=1), transition to the "in-control, collision alarm" sub-state occurs and a collision alarm is generated. If the acceleration required for avoiding collision is further increased (if the collision avoiding control flag XC=1), the state transits to the "in-control, collision avoiding control" sub-state, and a collision avoiding control is performed.

11 Claims, 6 Drawing Sheets

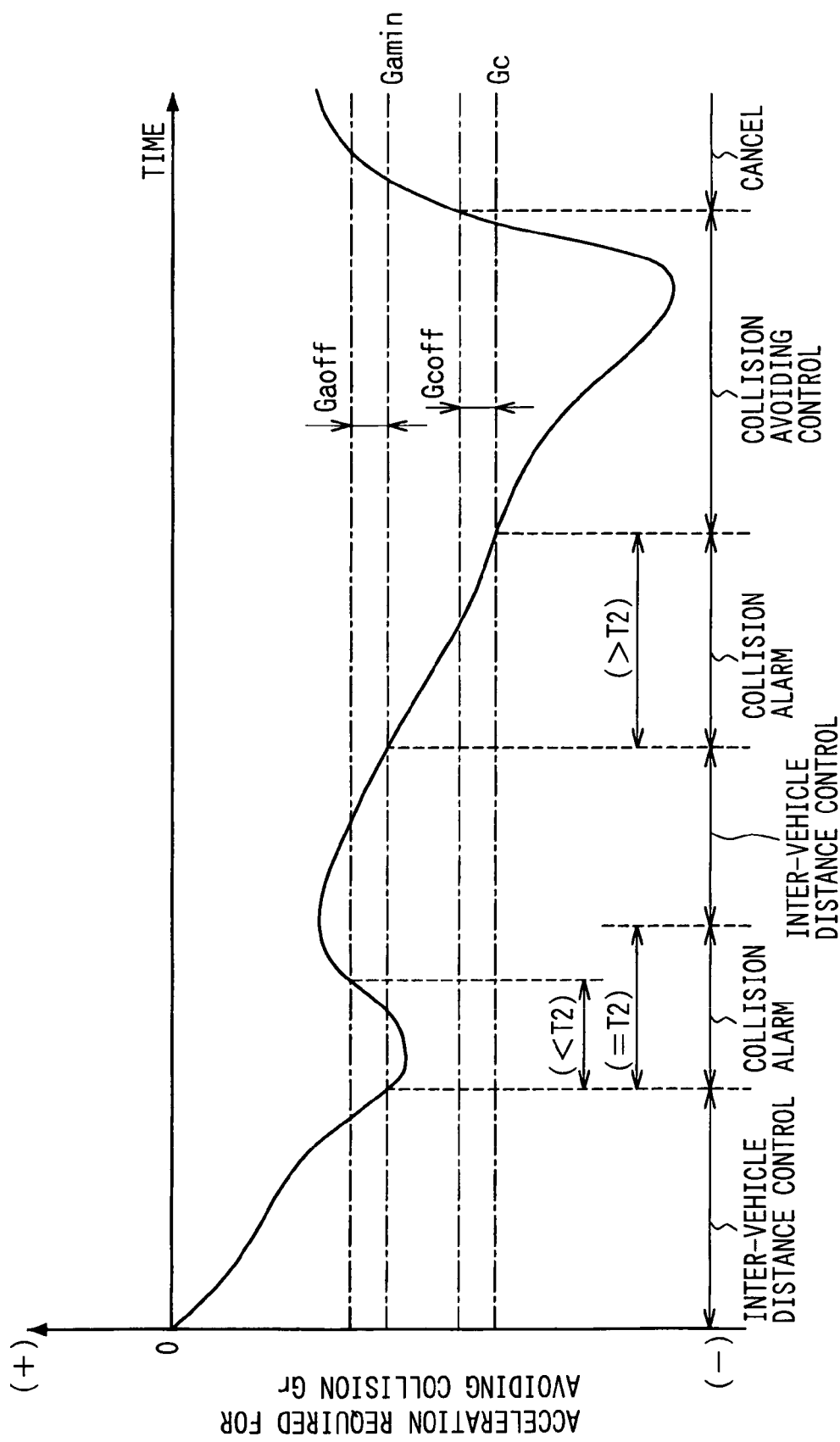

VEHICLE CONTROL SYSTEM

CROSS REFERENCE TO RELATED APPLICATIONS

This application is based upon, claims the benefit of priority of, and incorporates by reference Japanese Patent Applications No. 2003-46390 filed Feb. 24, 2003.

BACKGROUND OF THE INVENTION

1. Field of the Invention

The present invention relates to a vehicle control system for controlling running conditions, such as running speed and inter-vehicle distance, particularly for the purpose of avoiding a collision on the basis of the distance from or relative speed with respect to an object ahead of a vehicle.

2. Description of the Related Art

Conventionally, this type of vehicle control system is known as an Adaptive Cruise Control (ACC) that detects a preceding vehicle as an obstacle ahead of a vehicle, automatically controls the engine, gears, and brakes of the vehicle to provide a target acceleration that is determined on the basis of the distance from and relative speed with respect to the preceding vehicle, and the running condition of the vehicle. This makes it possible to properly maintain the distance from the preceding vehicle.

The ACC system typically has a limited maximum deceleration (minimum acceleration) that can be used in braking a vehicle for assuring safety of passengers. However, in some instances, even control at that maximum deceleration will not be able to avoid a collision with a preceding vehicle. For this reason, various control devices to be used in conjunction with an ACC system have been proposed for avoiding collision, including, for example, a device for signaling an alarm to a driver to prompt him or her, that is, to the person driving the vehicle, to intervene when it is determined that his or her vehicle is dangerously too close to a preceding vehicle (see Japanese Patent Laid-Open Publication No. 2000-177429); and a device adapted such that braking force generated when a driver intervenes and operates a brake is greater than a normal braking force for helping to avoid a collision (see Japanese Patent Laid-Open Publication No. Hei 11-139278). Further, other devices have also been proposed, which are not used with an ACC system, that detect a possibility of colliding with a preceding vehicle and automatically decrease vehicle speed by generating an acceleration (or deceleration) capable of avoiding the collision (see Japanese Patent Laid-Open Publication No. Hei 10-338110).

By combining these techniques, it will be possible to envision a control device for avoiding collision, which is used in conjunction with an ACC system, and which, when it is determined that a maximum deceleration of the ACC system is not sufficient to avoid a collision with a preceding vehicle, automatically decreases the vehicle speed by generating a deceleration (or negative acceleration) larger than the maximum deceleration.

However, using this type of device that automatically performs control for avoiding collision in addition to an ACC system, when a vehicle is in a potential collision state, the driver will not even be aware of this fact. Even if the driver is aware, the driver may not bother to intervene in the control, overestimating the effect of the device. These devices are merely for supporting drivers and, without the drivers' intervening in the control, will increase various risks all the more.

Specifically, these conventional control devices may not be able to avoid collision, even after performing any necessary control, depending upon the behavior of a preceding vehicle (e.g. abrupt deceleration) or the condition of the road surface (e.g. ice-covered road surface). Furthermore, if a sensor for detecting the preceding vehicle or obstacle makes a false detection, the control device will perform control for avoiding collision with something like an object on the street side that in fact poses no risk of collision, and will increase the risk of being rear-ended by a following vehicle.

In addition, ACC systems are mostly designed to suppress acceleration or deceleration if an object detected by a sensor is possibly not a vehicle, or if an object detected by a sensor is a vehicle but possibly is not correctly detected. In a case when the ACC system performs such suppression and at the same time a similar suppression is performed by an associated control device for avoiding a collision, it will not be possible to avoid collision with the detected object which is truly a vehicle.

SUMMARY OF THE INVENTION

It is, accordingly, an object of the present invention to overcome the aforementioned problems by enhancing the safety of driving by adapting a vehicle control system for activating collision avoiding control when collision with a preceding vehicle cannot be avoided by normal running condition control, such that, when a vehicle is in an emergency where the collision avoiding control is activated, the driver is reliably prompted to intervene in the control.

In the vehicle control system according to the present invention made for achieving the aforementioned object, a running condition control means controls the running condition of a vehicle by setting a target control amount based on a distance from and relative speed with respect to an object present ahead of the vehicle and accelerating or decelerating the vehicle according to the target control amount. If collision with the object cannot be avoided by the control performed by the running condition control means, the collision avoiding control means performs control for avoiding such collision.

The term "running condition" used herein at least includes running speed or inter-vehicle distance (or inter-vehicle time). Hereinafter, the control performed by the running condition control means is also referred to as running condition control, and the control performed by the collision avoiding control means is also referred to as collision avoiding control. If collision avoiding control is performed when an operation mode for performing running condition control is active, a cancel means cancels the operation mode.

According to the present invention, therefore, if collision avoiding control is performed during running condition control, the system will not automatically return to the running condition control but the driver is inevitably obliged to operate the vehicle. As a result, it is possible to prevent the driver from being excessively dependent on the control system and failing to intervene in the control (e.g. by operating the brake, etc.), expecting that collision avoiding control will be performed automatically, even though aware of a dangerous situation. If the driver is not aware of the dangerous situation, it is possible to alert the driver that the driver's vehicle is in such a dangerous situation that the collision avoiding control is activated. As a result, the driver's intervention in the control (operation of the brake) is called for in an early stage, so that the dangerous situation where the collision avoiding control is performed repeatedly is not neglected, and hence the safety of driving can be enhanced.

In the case where the running condition control means is designed such that when a target acceleration is smaller than an acceleration limit preset to a negative value, control is performed with the target acceleration limited to the acceleration limit. It is desirable that the collision avoiding control means is designed to perform control with an avoidance acceleration that is smaller than the acceleration limit at least at the start of activation, and that the avoidance acceleration is set such that a difference perceivable to the driver is generated between the behaviors of the vehicle during the running condition control state and during the collision avoiding control state. It is also desirable that a difference between the acceleration limit and the avoidance acceleration is specifically at least one-tenth of gravity's acceleration.

In this manner, by establishing an appropriate difference between the limit acceleration of the running condition control mode and the avoidance acceleration of the collision avoiding control mode, it is possible, beyond the limitation of the running condition control, to cause the driver to inevitably recognize that the collision avoiding control has started. When the system is provided with the aforementioned cancel means in particular, it is possible to cause the driver to recognize the reason why the running condition control has been canceled automatically.

Further, when there is a high possibility that the collision avoiding control means is activated, alarm means may generate an alarm. In this case, the system may be designed such that an inhibiting means inhibits operation of the collision avoiding control means when a specific operation indicating that control by no collision avoiding control means is necessary is detected in a period after the activation of the alarm means and before the activation of the collision avoiding control means. Thus, if the driver's will to operate the vehicle is expressed by the specific operation, the possibility is high that the detected object is false and not a preceding vehicle. According to the present invention, it is thus possible to prevent unnecessary collision avoiding control for such false objects that might activate the system and increase the risk of colliding with a following vehicle.

Further, particularly when the system is provided with the aforementioned cancel means, it is possible to prevent the running condition control from being canceled as a result of erroneous activation of the collision avoiding control, and hence from bothering the driver due to the unnecessary canceling. The specific operation may be operation of the accelerator peal or manipulation of a specified switch. When the possibility is low that the detected object is a vehicle, or when a device for detecting an object has low accuracy, a second inhibiting means may be provided for inhibiting the operation of the collision avoiding control means.

In this case, it is possible to reliably prevent the collision avoiding control from being activated for the detected object that is not a vehicle, and even if the object is really a preceding vehicle, minimum necessary processing, namely prompting the driver's intervention, is ensured by activation of the alarm means. Still further, in order to prevent the collision avoiding control from being activated for a false object, an enabling means may be provided for enabling the operation of the collision avoiding control means only when an object collision, which is to be avoided, has been an object of control by the running condition control means for a period of time equal to or more than a preset monitoring time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a graph of acceleration required for avoiding collision and state transitions.

DETAILED DESCRIPTION OF THE PREFERRED EMBODIMENTS

The following description of the preferred embodiments is merely exemplary in nature and is in no way intended to limit the invention, its application, or uses.

Figure 1:
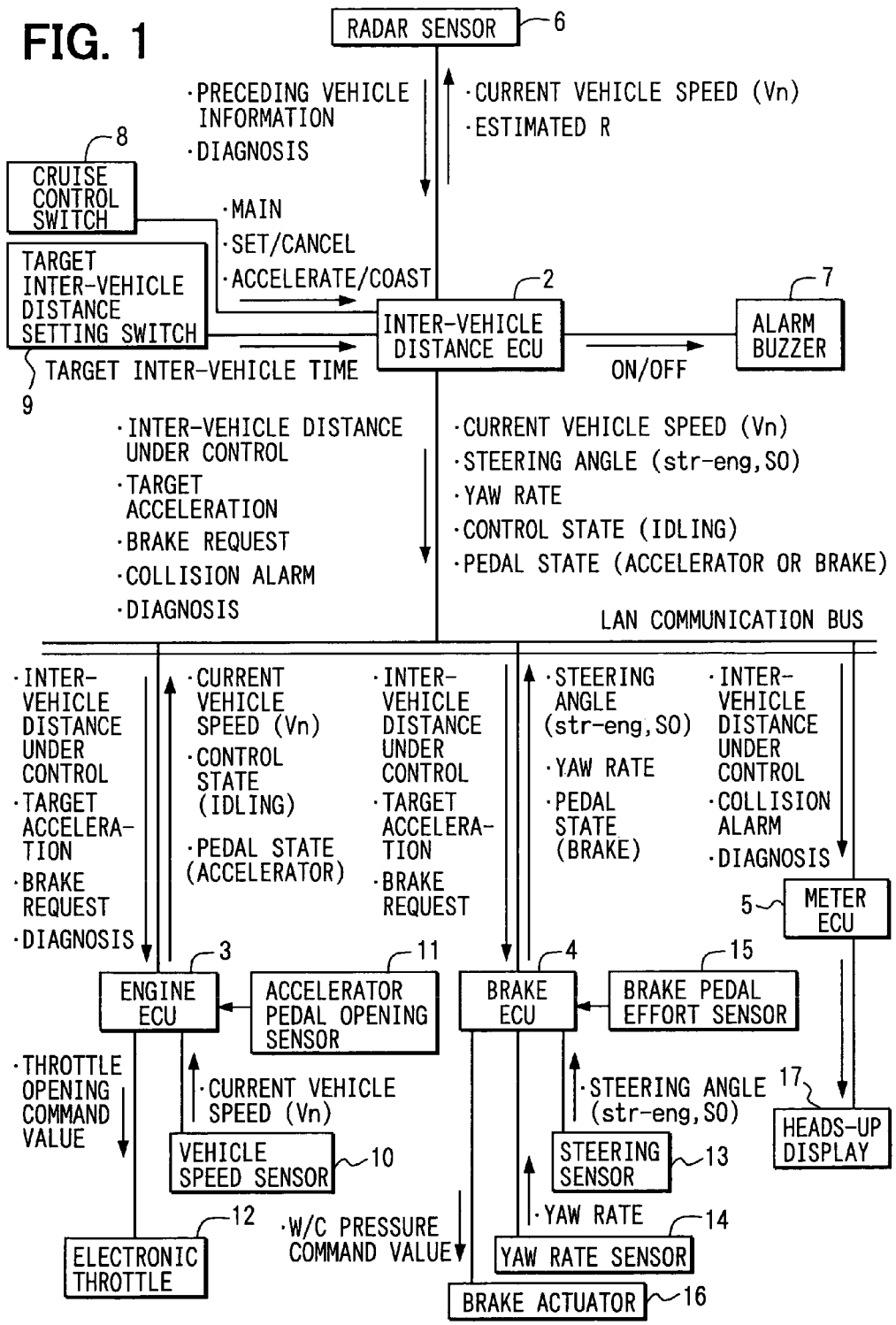
FIG. 1 is a block diagram schematically illustrating an adaptive cruise control (ACC) system.

FIG. 1 is a block diagram schematically illustrating an adaptive cruise control (ACC) system according to the present embodiment. As shown in FIG. 1, the ACC system comprises an inter-vehicle distance electronic control unit (hereinafter to be called "inter-vehicle distance ECU") 2, an engine electronic control unit (hereinafter to be called "engine ECU") 3, a brake electronic control unit (hereinafter to be called "brake ECU") 4, and a meter electronic control unit (hereinafter to be called "meter ECU") 5, which are mutually connected via a LAN communication bus. The ECUs 2, 3, 4, and 5 each employ a well-known microcomputer as a main component and comprise at least a bus controller for performing communications via the LAN communication bus. In the present embodiment, data communications between the ECUs are conducted via the LAN communication bus, using CAN ("Controller Area Network" by Robert Bosch GmbH in Germany) protocol that is commonly utilized by an on-vehicle network.

The inter-vehicle distance ECU 2 is also connected to a radar sensor 6, an alarm buzzer 7, a cruise control switch 8, and a target inter-vehicle distance setting switch 9. The radar sensor 6, constructed as a laser radar sensor, is an electronic circuit comprising, as principal components, a scanning range finder using laser light and a microcomputer.

Scanning laser light is directed by the scanning range finder within a predetermined angular range in the direction of a vehicle width, so that attribute information representing attributes of an object (whether the object is a vehicle, non-vehicle, or unknown) and a probability that the object is present on the vehicle's own lane (hereinafter to be called "own lane probability") are determined based on a distance from and angle with respect to the object detected by the reflected light, a current vehicle speed and estimated radius of curvature of a curve (hereinafter to be called "estimated R") received from the inter-vehicle distance ECU 2 and the like. At the same time, a collision flag is set for an object approaching the driver's vehicle. The own lane probability, attribute information and collision flag are sent to the inter-vehicle distance ECU 2 as preceding vehicle information that also includes information on the distance, relative speed and so on. A diagnosis signal of the radar sensor 6 itself is also sent to the inter-vehicle distance ECU 2. Alternatively, electric waves (e.g. millimeter waves) may be used as radar waves in place of the laser light.

The cruise control switch 8 comprises a main switch for activating/stopping the inter-vehicle distance ECU 2, a set switch for starting the inter-vehicle distance control described below, a cancel switch for terminating the inter-vehicle distance control, an accelerator lever for increasing a stored set speed, and a coast lever for decreasing the set speed.

The target inter-vehicle distance setting switch 9 is a switch in the ACC system manipulated by a driver for setting a time period required by the driver's vehicle to travel a distance corresponding to a target inter-vehicle distance between the driver's vehicle and a preceding vehicle (hereinafter to be called "target inter-vehicle time"). The target inter-vehicle time can be set within a predetermined range.

The engine ECU 3 then transmits to the inter-vehicle distance ECU 2 a current vehicle speed, a pedal (accelerator) state signal indicating the state of manipulation of the accelerator pedal, and a control state (idling) signal indicating whether or not the engine is in the idling state, based on sensor signals received from a speed sensor 10 for detecting a vehicle speed, an accelerator pedal opening sensor 11 for detecting an accelerator pedal opening, and a throttle opening sensor (not shown). On the other hand, the engine ECU 3 receives from the inter-vehicle distance ECU 2 an inter-vehicle distance in-control flag indicating whether the ACC system is active or not, a target acceleration, a brake request, a diagnosis signal or the like, then determines a driving state based on the information thus received, and in accordance with the determined driving state, outputs a drive command to an electronic throttle 12 or the like for adjusting an engine throttle opening.

The brake ECU 4 transmits to the inter-vehicle distance ECU 2 a steering angle received from a steering sensor 13 for detecting a steering angle of the vehicle and a yaw rate received from a yaw rate sensor 14 for detecting a yaw rate representing a turning state of the vehicle, as well as a pedal state (brake) signal from a brake pedal effort sensor 15 for detecting a state where a brake pedal is depressed. On the other hand, the brake ECU 4 receives, from the inter-vehicle distance ECU 2, an inter-vehicle distance in-control flag, a target acceleration, a brake request and so on, then determines a driving state based on the information thus received, and in accordance with the determined driving state, outputs a drive command to a brake actuator 16 or the like that controls a W/C pressure of a brake hydraulic circuit for controlling a braking force.

The meter ECU 5 receives, via the LAN communication bus, information on various states of a vehicle, including vehicle speed, engine speed, door open/close state, and transmission shift range, and displays these items of information on a meter display (not shown). Also, the meter ECU 5 receives, from the inter-vehicle distance ECU 2, an inter-vehicle distance in-control flag, a collision alarm, a diagnosis signal and so on, and displays these items of information on a heads-up display 17 or the like.

The inter-vehicle distance ECU 2 receives information on the current vehicle speed (Vn), engine control state, and pedal state (accelerator) from the engine ECU 3, and receives information on steering angle (str-eng, S0), yaw rate, pedal state (brake) and soon from the brake ECU 4. The inter-vehicle distance ECU 2 determines a preceding vehicle to be the target of the ACC based on the "own lane probability" included in the preceding vehicle information received from the radar sensor 6, and sends an inter-vehicle distance in-control flag to the respective ECUs 3, 4, and 5 based on detection signals from the cruise control switch 8 and target inter-vehicle distance setting switch 9. At the same time, the inter-vehicle distance ECU 2 transmits, as control command values for proper adjustment of distance from the preceding vehicle, the target acceleration, brake request, diagnosis signal and the like to the engine ECU 3, the target acceleration, brake request, and the like to the brake ECU 4, and the collision alarm, diagnosis signal and soon to the meter ECU 5. Further, the inter-vehicle distance ECU 2 determines whether or not an alarm is to be generated, and if necessary activates the alarm buzzer 7.

Figure 2:
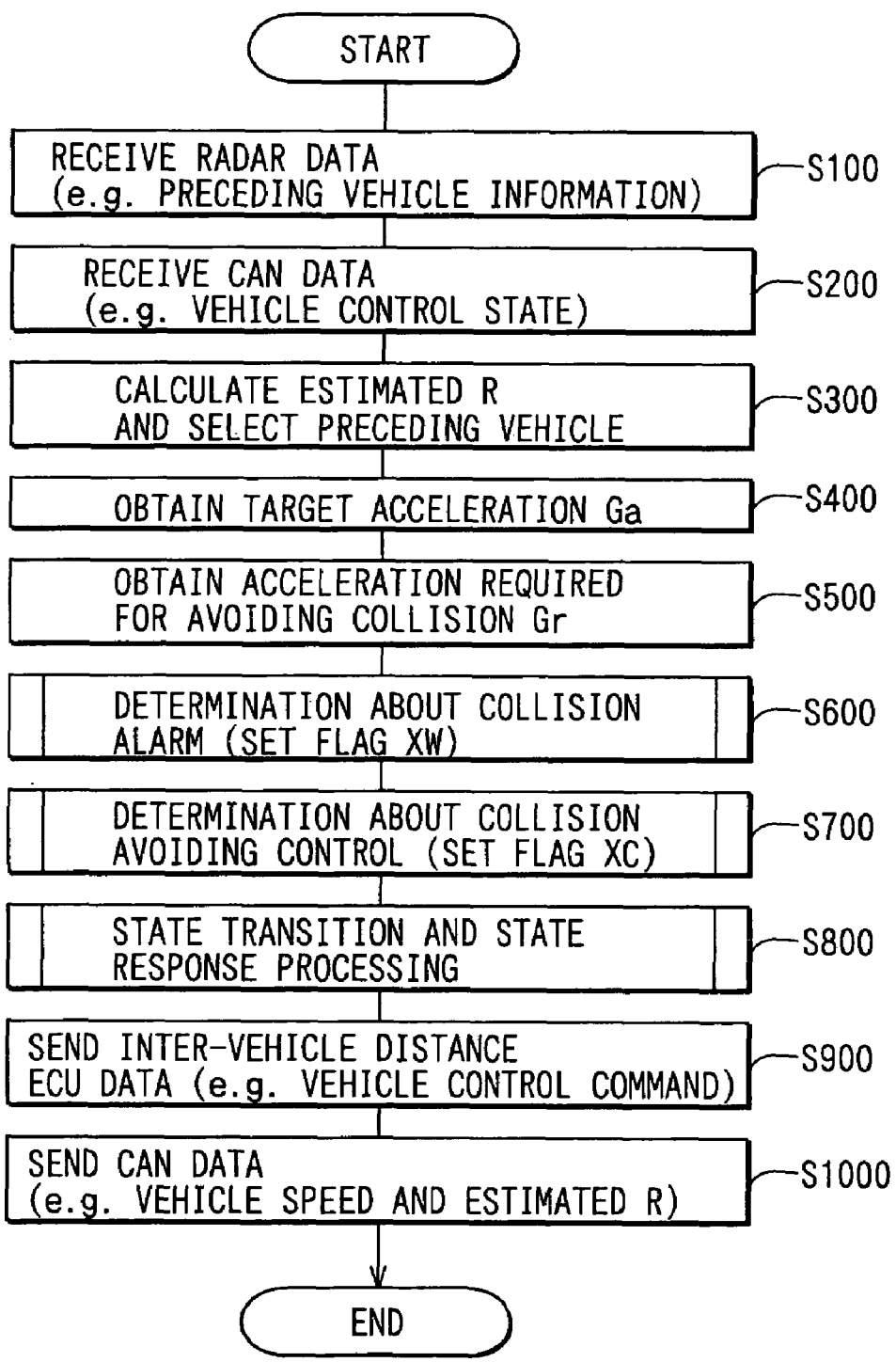
FIG. 2 is a flow chart showing the main processing performed by an inter-vehicle distance ECU.

Next, main processing performed by the inter-vehicle distance ECU 2 will be described with reference to the flow chart in FIG. 2. First, radar data including preceding vehicle information is received from the radar sensor 6 (S100), and successively CAN data including a current vehicle speed (Vn), engine control state (idling), pedal state (accelerator or brake), steering angle (str-eng, S0), yaw rate and so on are received from the engine ECU 3 and brake ECU 4 (S200).

Then, an estimated R representing the traveling direction of the vehicle is calculated based on the steering angle, yaw rate and current vehicle speed acquired in S200, and an object (i.e. a preceding vehicle) to be the object of control is selected based on the own lane probability and attribute information based on radar data and the like acquired in S100 (S300). Specifically, an object that is closest to the vehicle is selected as a preceding vehicle from among detected objects which have a certain level of probability of being present in the vehicle's lane, and attribute information indicating that the object is a vehicle or unknown.

Further, a target acceleration Ga is determined based on a distance from and relative speed with respect to the preceding vehicle selected in S300, attribute information of the preceding vehicle, and a target inter-vehicle distance set by the target inter-vehicle distance setting switch 9 (S400).

More specifically, if no preceding vehicle has been selected in S300, a target acceleration Ga is determined such that the vehicle is driven at a constant speed set by the manipulation of the accelerator lever or coast lever. On the other hand, if a preceding vehicle has been selected in S300, a target acceleration Ga is determined by using a preset control map with an inter-vehicle distance difference ratio and a relative speed with respect to the preceding vehicle used as parameters.

Here, an inter-vehicle distance difference ratio (%) is obtained by subtracting a target inter-vehicle distance set by the target inter-vehicle distance setting switch 9 from a current inter-vehicle distance to obtain an inter-vehicle distance difference, dividing this inter-vehicle distance difference by the target inter-vehicle distance, and multiplying the resultant quotient by 100. However, the control map is set such that the target acceleration Ga becomes greater as the inter-vehicle distance difference ratio is greater. It should be noted that a maximum value Gamax (0.5 m/s2 in the present embodiment) and a minimum value Gamin (−2 m/s2 in the present embodiment) are set for the target acceleration Ga and the control map is set such that the target acceleration Ga is within the range between these values. The relative speed used for this processing is processed by a low-pass filter for suppressing variation in values due to measurement error.

Then, an acceleration required for avoiding collision Gr (m/s2) is determined by the following equation (1) based on a distance from the preceding vehicle D (m), a relative speed V (m/s) and an acceleration of the preceding vehicle A (m/s2) (S500).

$$Gr = A - V2/(2 \times (D - Dfin)) \quad (1)$$

Here, Dfin denotes a minimum distance to be maintained (2 meters in the present embodiment). In other words, the acceleration required for avoiding collision Gr is an acceleration that makes the relative speed V zero when the relative distance with respect to the preceding vehicle reaches Dfin.

After that and onwards, determination about collision alarm (S600), determination about collision avoiding control (S700), and state transition and state response processing (S800) are carried out by using the radar data and CAN data received in S100 and S200, and the target acceleration Ga and acceleration required for avoiding collision Gr obtained in S400 and S500. These processings will be described later more particularly.

Thereafter, CAN data including the target acceleration, brake request, diagnosis signal, and display data are sent to the engine ECU 3, brake ECU 4, and meter ECU 5 (S900) and data including the current vehicle speed (Vn) and estimated R are sent to the radar sensor 6 (S1000). Thus the main processing of the inter-vehicle distance ECU ends.

Figure 3:
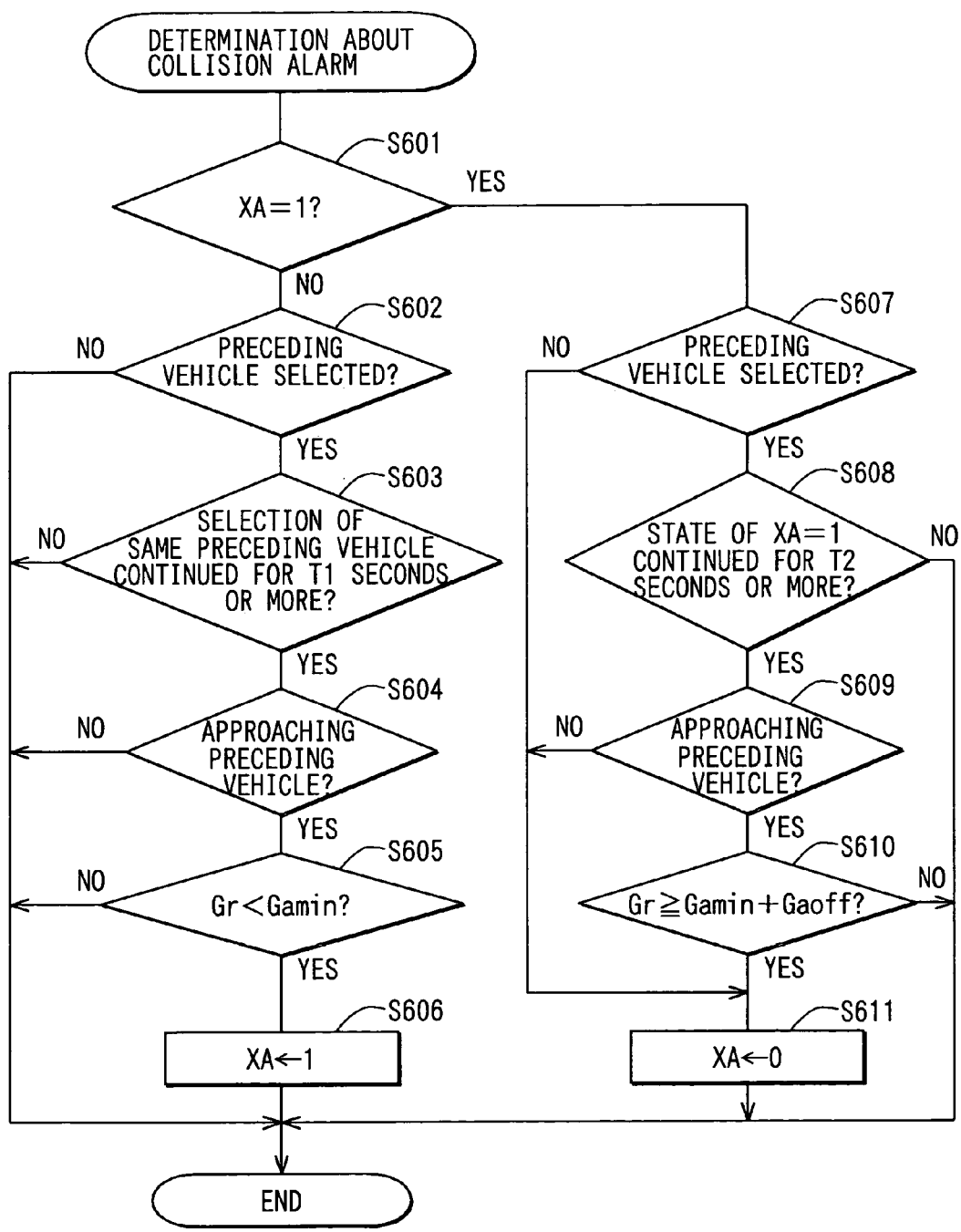
FIG. 3 is a flow chart showing a collision alarm determination routine.

Particulars of the processings of S500 through S700 will be described sequentially below. In the determination about collision alarm performed in S600, as shown in the flow chart of FIG. 3, it is determined in the first place if the collision alarm flag XA, that is set for generating a collision alarm, is set to 1 (S601), and if it is not set to 1, the following processings are performed to determine whether or not conditions for generating a collision alarm are established (S602 through S606).

More particularly, it is sequentially determined whether a preceding vehicle has been selected in S300 (S602), whether the selected preceding vehicle has been selected continuously for a preset monitoring time T1 or more (5 seconds in the present embodiment) (S603), whether the driver's vehicle is approaching the preceding vehicle (relative speed R is less than 0) (S604), and whether the acceleration required for avoiding collision Gr obtained in S500 is smaller than the minimum value Gamin of the target acceleration Ga, or whether collision cannot be avoided by a normal inter-vehicle distance control in which the target acceleration Ga is limited (S605). If any one of the determinations is negative, that is, if any one of the conditions is met: a preceding vehicle has not been selected, the preceding vehicle has not been continuously selected for the monitoring time T1 or more, R≧0, or Gr≧Gamin, then the processing ends without setting the collision alarm flag XA.

On the other hand, if the determinations in S602 through S605 are all positive, that is, if all of the conditions are met: a preceding vehicle has been selected, the preceding vehicle has been continuously selected for the monitoring time T1 or more, R<0, and Gr<Gamin, then the collision alarm flag XA is set to 1 (S606) and the processing ends.

If it is determined that the collision alarm flag XA is set to 1 in S601, then the following processings will be performed to determine whether conditions for canceling the collision alarm mode are established (S607 through S611).

More particularly, it is determined sequentially whether a preceding vehicle has been selected in S300 (S607), whether the state where the collision alarm flag XA is set to 1 has continued for a preset minimum duration time T2 or more (1 second in the present embodiment) (S608), whether the driver's vehicle is approaching the preceding vehicle (relative speed R is less than zero) (S609), and whether the acceleration required for avoiding collision Gr obtained in S500 is equal to or greater than a value obtained by adding a predetermined value Gaoff (0.5 m/s2 in the present embodiment) to the minimum value Gaoff of the target acceleration Ga.

If it is determined that a preceding vehicle has not been selected in S607, or if it is determined that a preceding vehicle is selected in S607 and both of the conditions are met in S608 and S609: the state of XA=1 has continued for a grace period T2 or more, and the driver's vehicle is not approaching the preceding vehicle, or if all the conditions are met in S608 through S610: the state of XA=1 has continued for a grace period T2 or more, the driver's vehicle is approaching the preceding vehicle, and Gr≧Gamin+Gaoff, then the collision alarm flag XA is reset to 0 (S611) and the processing ends.

On the other hand, if it is determined that a preceding vehicle has been selected in S607, and it is determined in S608 through S610 that the duration time of XA=1 is less than the minimum duration time T2, or that the driver's vehicle is approaching the preceding vehicle and Gr<Gamin+Gaoff, then the processing ends without setting the collision alarm flag XA.

In other words, in these processings, if the collision alarm flag XA has been reset, it is determined whether or not the collision alarm flag XA is set according to the acceleration required for avoiding collision Gr only when the probability is high that the selected preceding vehicle is actually existent and the driver's vehicle is approaching the preceding vehicle. In the case when the collision alarm flag XA has been set to 1, the collision alarm flag XA is reset to 0 unconditionally if a preceding vehicle has not been selected. However, if a preceding vehicle has been selected, it is determined whether or not the collision alarm flag XA is reset according to the acceleration required for avoiding collision Gr only when the driver's vehicle is approaching the selected preceding vehicle. The threshold value of the acceleration required for avoiding collision Gr used for setting or resetting the collision alarm flag XA has a hysteresis and is set such that once the collision alarm flag XA is set, this set state will continue at least for the minimum duration time T2 so far as the preceding vehicle has been selected.

Figure 4:
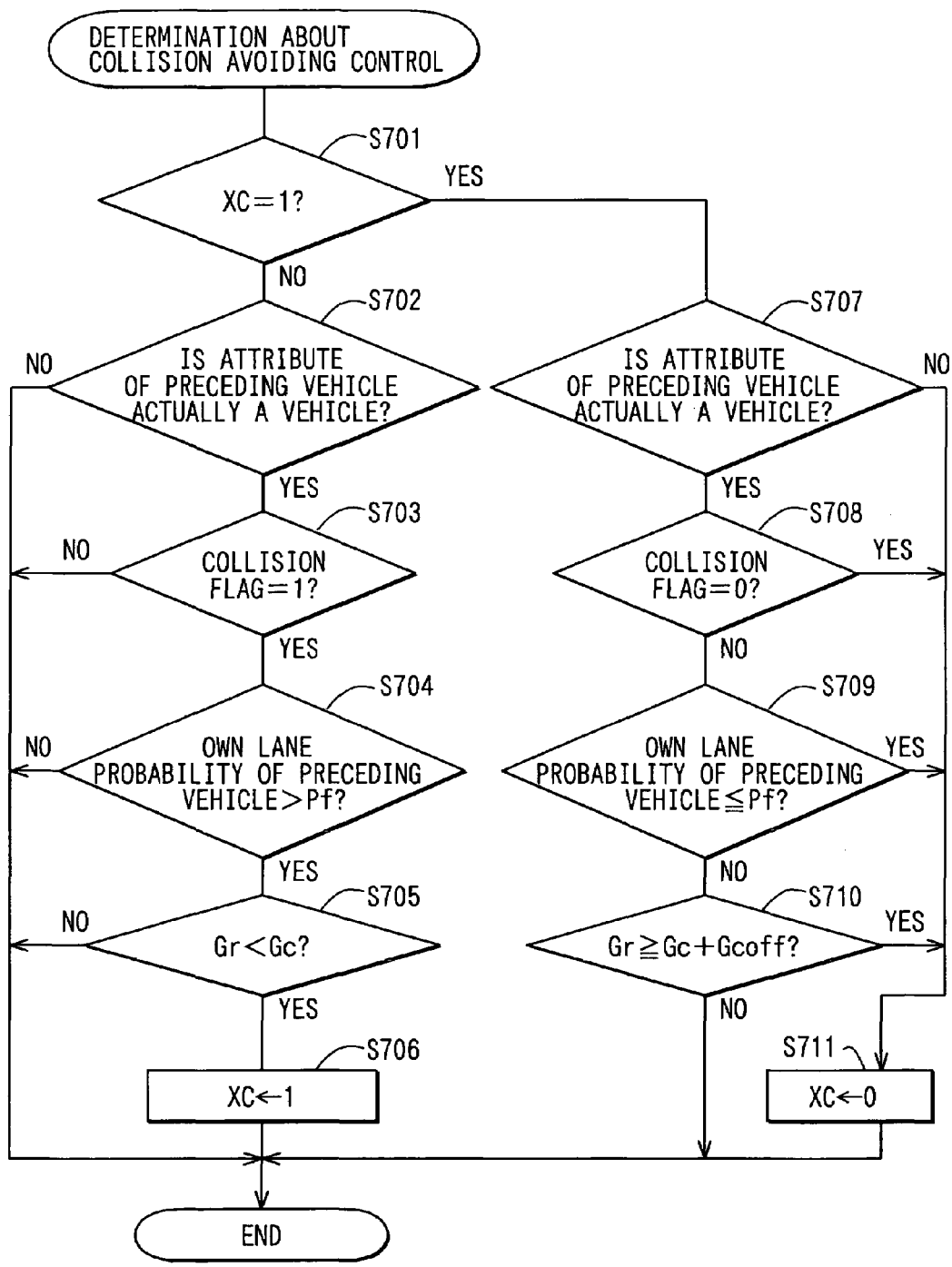
FIG. 4 is a flow chart showing a collision avoiding control determination routine.

Next, in the determination about collision avoiding control to be performed in S700, as shown in the flow chart of FIG. 4, it is in the first place determined whether a collision avoiding control flag XC set for performing a collision avoiding control is set to 1 (S701). If it is not so set, the following processings are performed to determine whether the conditions for performing a collision avoiding control are established (S702 through S706).

More particularly, it is sequentially determined whether the attribute of the preceding vehicle selected in S300 is a vehicle (S702), whether the collision flag for the preceding vehicle is set to 1 (S703), whether the own lane probability of the preceding vehicle is greater than a threshold value Pf (80% in the present embodiment) enabling the determination that the possibility of the preceding vehicle being present in the vehicle driver's own lane is sufficiently high (S704), and whether the acceleration required for avoiding collision Gr obtained in S500 is smaller than a determination value Gc that is set to a value smaller than the minimum value Gamin of the target acceleration Ga for attaining a greater deceleration (Gc=Gamin−0.98 (m/s2) in the present embodiment)

(S705). It should be noted that this determination value Gc corresponds to an avoidance acceleration in the present invention, and the maximum value Gamin corresponds to a limit acceleration in the present invention.

If any one of the determinations in S702 through S705 is negative, more specifically, if any one of the conditions are met: the attribute of the preceding vehicle is not a vehicle, the collision flag is reset to 0, the own lane probability is equal to or less than the threshold value Pf, or $Gr \geq Gc$, then the processing ends here without setting the collision avoiding flag XC.

On the other hand, if all the determinations in S702 through S705 are positive, that is, if all the conditions are met: the attribute of the preceding vehicle is a vehicle, the collision flag is set to 1, the own lane probability is larger than the threshold value Pf, and Gr<Gc, then the collision avoiding control flag XC is set to 1 (S706) and the processing ends.

If it is determined that the collision avoiding control flag XC is set to 1 in S701, the following processings are performed to determine whether the conditions to cancel the collision avoiding control are established (S707 through S711). Specifically, it is sequentially determined whether the attribute of the preceding vehicle selected in S300 is a vehicle (S707), whether the collision flag for the preceding vehicle is set to 1 (S708), whether the own lane probability of the preceding vehicle is equal to or less than the threshold value Pf (S709), and whether the acceleration required for avoiding collision Gr obtained in S500 is equal to or greater than a value obtained by adding a predetermined value Gcoff (0.5 m/s2 in the present embodiment) to the determination value Gc (S710).

If it is determined in S607 through S610 that any of the conditions is met: the attribute of the preceding vehicle is not a vehicle, the collision flag is reset to 0, the own lane probability is equal to or less than the threshold value Pf, or $Gr \geq Gc+Gcoff$, then the collision avoiding control flag XC is reset to 0 (S711) and the processing ends.

On the other hand, if it is determined in S607 through S610 that all of the conditions are met: the attribute of the preceding vehicle is a vehicle, the collision flag is set to 1, the own lane probability is greater than the threshold value Pf, and Gr<Gc+Gcoff, then the processing ends without setting the collision avoiding control flag XC.

In other words, if collision avoiding control flag XC is reset, it is determined whether the collision avoiding control flag XC is to be set based on the acceleration required for avoiding collision Gr only when the selected preceding vehicle is a vehicle present in the vehicle's own lane and is approaching the driver's vehicle. If the collision avoiding control flag XC is set to 1, the collision avoiding control flag XC is reset to 0 unconditionally when the preceding vehicle is not a vehicle, is not approaching the driver's vehicle, or is not present in the vehicle driver's own lane, and it is determined whether or not the collision avoiding control flag XC is reset based on the acceleration required for avoiding collision Gr only when none of these conditions is met. The threshold value used for setting or resetting the collision avoiding control flag XC is set to have a hysteresis.

Now, the state transition and state response processing performed in S800 will be described. In this processing, the states that can be transited include a "cancel" state and "in-control" state. The "in-control" state can be further classified into three sub-states of "in-control, inter-vehicle distance control", "in-control, collision alarm," and "in-control, collision avoiding control" sub-states.

Figure 5:
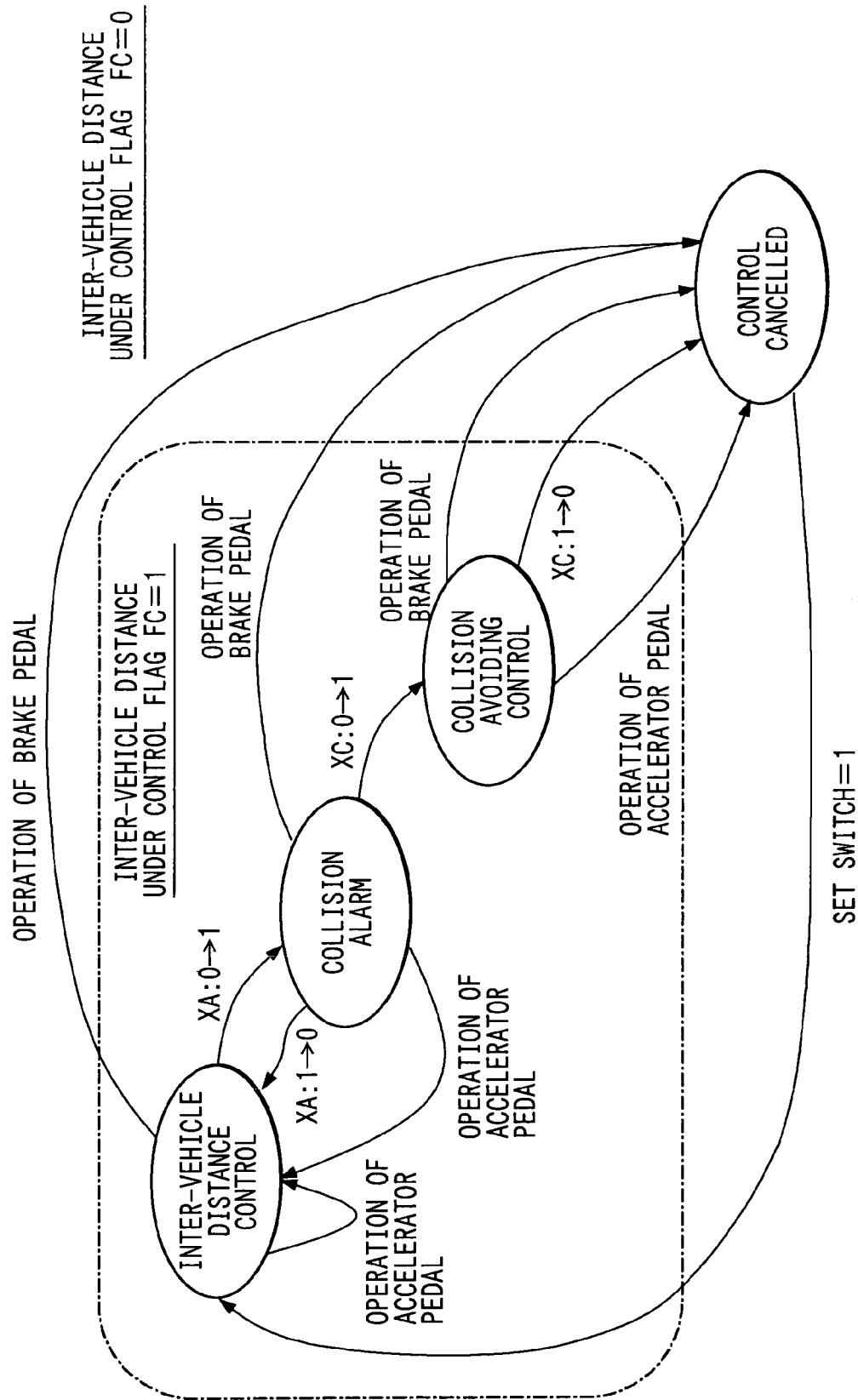
FIG. 5 is a state transition diagram showing the processing performed in state transition or state response.

A state transition is performed according to the state transition diagram in FIG. 5 based on the collision alarm flag XA set in S600, the collision avoiding control flag XC set in S700, and the pedal state (accelerator or brake).

First, the "cancel" state (the inter-vehicle distance in-control flag FC=0) is established immediately after the main switch is turned on. When the set switch is turned on in this "cancel" state, the state transits to "in-control, inter-vehicle distance control" sub-state (the inter-vehicle distance in-control flag FC=1). This means that an operation mode for performing the inter-vehicle distance control is established.

In any of the three sub-states of the "in-control" state, the state transition to the "cancel" state occurs whenever an operation of the brake pedal is detected. This means that the operation mode for performing the inter-vehicle distance control is canceled.

Next, when the collision alarm flag XA is set in the "in-control, inter-vehicle distance control" sub-state of the "in-control" state, the state transits to the "in-control, collision alarm" sub-state.

In the "in-control, collision alarm" sub-state, the state transition to the "in-control, inter-vehicle distance control" sub-states occurs when the collision alarm flag XA is reset or an operation of the accelerator is detected. It is desirable to inhibit the determination concerning a collision alarm for a predetermined time period in order to prevent the state from transiting to the "in-control, collision alarm" sub-state again immediately after the transition to the "in-control, inter-vehicle distance control" sub-state. When the collision avoiding control flag XC is set, the state transits to the "in-control, collision avoiding control" sub-state.

In the "in-control, collision avoiding control" sub-state, the state transits to the "cancel" state when the collision avoiding control flag XC is reset or an operation of the accelerator pedal is detected. Namely, it is ensured that the "in-control" state is canceled whenever a transition to the "in-control, collision avoiding control" sub-state has occurred.

As for the state response processing, when in the "in-control, inter-vehicle distance control" sub-state, the inter-vehicle distance ECU 2 generates a brake request after determining whether or not the vehicle needs to be braked based on the target acceleration Ga calculated in S400, and sends the target acceleration Ga and the brake request to the engine ECU 3 and the brake ECU 4.

The engine ECU 3 finds a throttle opening command value based on the target acceleration Ga, and drives and controls the electronic throttle 12 after determining whether or not a control is to be performed based on the brake request. The brake ECU 4 finds a W/C pressure command value based on the target acceleration Ga, and controls the brake actuator 16 after determining whether or not control is to be performed based on the brake request, so that acceleration or deceleration can be performed in accordance with the target acceleration Ga. Specifically, if an actual acceleration is greater than the target acceleration (or an actual deceleration is smaller than the target deceleration), a throttle opening command value is obtained so as to close the throttle, and a W/C pressure command value is obtained so as to increase the braking force.

When in the "in-control, collision alarm" sub-state, the inter-vehicle distance ECU 2 causes the alarm buzzer 7 to sound for alerting the driver that there is a high possibility of the collision avoiding processing being started in the near future, and sends to the meter ECU 5 a signal indicating that a collision alarm is being generated. The meter ECU 5 displays on the heads-up display 17 a message to prompt the driver to operate the brake and to thus intervene in the control and, at the same time, gives a visual notice to the driver for allowing him or her to prepare for deceleration by the collision avoiding control.

When in the "in-control, collision avoiding control" sub-state, the inter-vehicle distance ECU 2 sets the acceleration required for avoiding collision Gr obtained in S500 as target acceleration Ga and performs similar processing to the processing performed when in the "in-control, inter-vehicle distance control" sub-state.

In the present embodiment, the processing performed in the "in-control, inter-vehicle distance control" sub-state corresponds to running condition control means, the processing performed in the "in-control, collision alarm" sub-state corresponds to alarm means, and the processing performed in the "in-control, collision avoiding control" sub-state corresponds to a collision avoiding control means. The processing to transit the state from the "in-control, collision alarm" sub-state to the "in-control, inter-vehicle distance control" sub-state when an operation of the accelerator pedal is detected corresponds to an inhibiting means, the processing in S702 through S704 corresponds to a second inhibiting means, and the processing in S603 corresponds to an enabling means.

As seen from FIG. 6, in the ACC system thus constructed according to the present invention, generation of a collision alarm is started as soon as the acceleration required for avoiding collision Gr becomes smaller than the minimum value Gamin of the target acceleration Ga during an inter-vehicle distance control. If the acceleration required for avoiding collision Gr then returns to a value greater than the value of Gamin+Gaoff without reaching the determination value Gc, the collision alarm mode is canceled and the system returns to the inter-vehicle distance control mode. However, if the time period required for returning to a value greater than the value of Gamin+Gaoff is less than the minimum duration time T2, the collision alarm mode is continued until the minimum duration time T2 elapses. It should be noted that, though it is not shown in the drawing, if an operation of the accelerator pedal is detected during generation of a collision alarm, the collision alarm mode will be immediately canceled and the system returns to the inter-vehicle distance control mode.

On the other hand, if the acceleration required for avoiding collision Gr becomes smaller than the determination value Gc during generation of a collision alarm, the collision avoiding control is started. When the acceleration required for avoiding collision Gr then returns to a value greater than the value of Gc+Gcoff, the system will not return to the inter-vehicle distance control or collision avoiding control and the operation mode to perform these controls is canceled.

As discussed above, the control system according to the present embodiment is designed such that, after a collision avoiding control has been performed, the system cancels the control mode instead of automatically returning to the inter-vehicle distance control mode and makes the driver to operate the vehicle. Therefore, it is possible to make the driver aware of the fact that the driver's vehicle is in a dangerous situation where the collision avoiding control was required. As a result, the driver will intervene in the control (by operating the brake) in an early stage, and in such a dangerous situation that requires repeated collision avoiding controls will not be permitted to continue thereafter. This means that the safety of driving can be improved.

Further, in the present embodiment, a large difference (0.98 m/s2=0.1 G) is established between the minimum value Gamin of a target acceleration set in the inter-vehicle distance control and the acceleration required for avoiding collision Gr for performing a collision avoiding control, so that when a collision avoiding control is started, the vehicle changes its behavior in such a manner that the change is perceptible to the driver. Therefore, the driver is inevitably made aware of the fact that the collision avoiding control has been started, and thus made to recognize the reason why the ACC is automatically canceled thereafter.

Further, the present embodiment is adapted such that a collision alarm is generated before starting a collision avoiding control, and if an operation indicating that no collision avoiding control is necessary (e.g. operation of the accelerator pedal) is detected at this point of time, the system returns to a normal inter-vehicle distance control mode without performing the collision avoiding control. In other words, if the driver's will to operate the vehicle is expressed by a specific operation, the possibility will be high that the detection of an object is false and a collision avoiding control will not be necessary with respect to such falsely detected object. Thus, it is possible to avoid increasing the risk of collision with a following vehicle as a result of performing such unnecessary collision avoiding control, and also to avoid burdening the driver by obliging him/her to cancel the ACC after an unnecessary collision avoiding control.

Further, the present embodiment is designed such that the generation of a collision alarm and thus the activation of a collision avoiding control are enabled only for an object (preceding vehicle) that has been the object of control for a period time equal to or longer than the monitoring time T1 during the inter-vehicle distance control, and such that when the possibility is low that the object of control is not a vehicle, only the collision alarm is generated and the collision avoiding control is not activated.

As a result, according to the present embodiment, it is possible to prevent a collision avoiding control from being performed for an object that has been falsely detected or that is not a vehicle. Even if the object is really a vehicle, the minimum necessary processing, namely prompting the driver to intervene in the control, can be carried out reliably by generating the collision alarm.

Although only one embodiment of the present invention has been described in the above, the present invention is not limited thereto but may be practiced or embodied in various other ways. For example, in the embodiment as described above, the transition to the "in-control, inter-vehicle distance control" sub-state occurs when an accelerator pedal is operated in the "in-control, collision alarm" sub-state, but the certain switch specified in advance may be used instead of the accelerator pedal. Further, this state transition may be even omitted.

Still further, in the embodiment as described above, the step S702 is provided as the second inhibiting means so that the collision avoiding control is inhibited when the possibility is low that the detected object is a vehicle. However, in addition to (or in place of) this, the collision avoiding control may be inhibited when it is determined that the detection accuracy of the radar sensor 6 is lowered based on the diagnosis signal from the radar sensor 6 or the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle control system comprising:
means for controlling a running condition of a vehicle by setting a target control amount based on a distance from the vehicle to an object present ahead of the vehicle and relative speed with respect to said object present ahead of the vehicle and accelerating or decelerating the vehicle according to the target control amount;
means for performing control for avoiding a collision with the object if the collision cannot be avoided by the control performed by the running condition control means; and
means for canceling an operation mode for allowing the running condition control means to perform control if control by the collision avoiding control means is activated when the operation mode is active.

2. The vehicle control system according to claim 1, wherein the target control amount is a target acceleration;
the running condition control means performs control with the target acceleration limited to a limit acceleration that is preset to a negative value if the target acceleration is smaller than the limit acceleration;
the collision avoiding control means performs control with an avoidance acceleration that is smaller than the limit acceleration at least at the start of activation thereof; and
the avoidance acceleration is set such that a perceivable difference to the driver is generated between behaviors of the vehicle during control by the running condition control means and during control by the collision avoiding control means.

3. The control system according to claim 1, further comprising:
a control switch operable manually to initiate the operation mode of the running condition control means, wherein the running condition control means is enabled to perform the operation mode only by the control switch when the operation mode of the running condition control means is cancelled by the canceling means.

4. A vehicle control system comprising:
means for controlling a running condition of a vehicle by setting a target acceleration based on a distance from the vehicle to an object present ahead of the vehicle and relative speed with respect to said object present ahead of the running vehicle and accelerating or decelerating the vehicle according to the target acceleration; and
means for performing control for avoiding collision if a collision with the object cannot be avoided by the control performed by the running condition control means, wherein
the running condition control means performs actual control with the target acceleration limited to a limit acceleration that is preset to a negative value if the target acceleration is smaller than the limit acceleration;
the collision avoiding control means performs control with an avoidance acceleration that is smaller than the limit acceleration at least at the start of the control; and
the avoidance acceleration is set such that a perceivable difference to the driver is generated between behaviors of the vehicle during control by the running condition control means and during control by the collision avoiding control means.

5. The vehicle control system according to claim 4, wherein the difference between the limit acceleration and the avoidance acceleration is at least one-tenth of gravity's acceleration.

6. The vehicle control system according to claim 5, further comprising:
alarm means for generating an alarm when the possibility is high that the collision avoiding control means is activated.

7. The vehicle control system according to claim 6, further comprising:
means for inhibiting operation of the collision avoiding control means if a specified operation indicating that no control by the collision avoiding control means is necessary is detected in a period after activation of the alarm means and before activation of the collision avoiding control means.

8. The vehicle control system according to claim 7, wherein the specified operation is an operation of an accelerator pedal or a specified switch.

9. The vehicle control system according to claim 6, further comprising:
second inhibiting means for inhibiting operation of the collision avoiding control means when the possibility is low that the object is a vehicle or when an object detecting device exhibits low detecting accuracy.

10. The vehicle control system according to claim 9, further comprising:
means for enabling operation of the collision avoiding control means only when an object, a collision with which is to be avoided, has been an object of control by the running condition control means for a preset monitoring time or more.

11. A vehicle control system comprising:
means for controlling a running condition of a vehicle by setting a target control amount based on a distance from the vehicle to an object present ahead of the vehicle and relative speed with respect to said object present ahead of the vehicle and accelerating or decelerating the vehicle according to the target control amount;
means for performing control for avoiding collision if a collision with the object cannot be avoided by the control performed by the running condition control means;
means for generating an alarm when the possibility is high that the collision avoiding control means is activated; and
means for inhibiting operation of the collision avoiding control means if a specified operation indicating that no control by the collision avoiding control means is necessary is detected in a period after activation of the alarm means and before activation of the collision avoiding control means.

* * * * *